(12) United States Patent
    Harada

(10) Patent No.: US 8,601,280 B2
(45) Date of Patent: Dec. 3, 2013

(54) APPLICATION EXECUTING APPARATUS AND APPLICATION EXECUTION METHOD

(75) Inventor: Toru Harada, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1299 days.

(21) Appl. No.: 11/670,125

(22) Filed: Feb. 1, 2007

(65) Prior Publication Data

US 2007/0198795 A1     Aug. 23, 2007

(30) Foreign Application Priority Data

Feb. 8, 2006   (JP) ................................. 2006-031477

(51) Int. Cl.
    *G06F 21/00*       (2013.01)
(52) U.S. Cl.
    USPC ........................................... 713/189; 726/21
(58) Field of Classification Search
    USPC ..................................... 726/21; 713/172, 189
    See application file for complete search history.

(56) References Cited

U.S. PATENT DOCUMENTS

| | | | | |
|---|---|---|---|---|
| 6,367,019 | B1 * | 4/2002 | Ansell et al. | 726/26 |
| 6,606,707 | B1 * | 8/2003 | Hirota et al. | 713/172 |
| RE39,802 | E * | 8/2007 | Hasebe et al. | 713/193 |
| 2003/0221113 | A1 * | 11/2003 | Kupka et al. | 713/189 |
| 2007/0168950 | A1 * | 7/2007 | Gamou et al. | 717/116 |

FOREIGN PATENT DOCUMENTS

| | | |
|---|---|---|
| JP | 2001-306170 | 11/2001 |
| JP | 2002-49434 | 2/2002 |
| JP | 2004-110779 | 4/2004 |
| JP | 2004-139442 | 5/2004 |
| JP | 2004-303210 | 10/2004 |
| JP | 2005-157429 | 6/2005 |
| JP | 2005-301968 | 10/2005 |

OTHER PUBLICATIONS

Office Action issued Jul. 12, 2011, in Japanese Patent Application No. 2006-031477.

* cited by examiner

*Primary Examiner* — Taghi Arani
*Assistant Examiner* — Tracy Mangialaschi
(74) *Attorney, Agent, or Firm* — Oblon, Spivak, McClelland, Maier & Neustadt, L.L.P.

(57) ABSTRACT

An application executing apparatus includes a connecting unit configured to receive connection of an external storage medium that stores therein an application and first medium identification information unique to the external storage medium. A storage unit stores therein permission information associated with the application and the first medium identification information. The permission information indicates whether execution of corresponding application is to be permitted. A determining unit determines whether to execute the application stored on the external storage medium based on the first medium identification information and the application stored on the external storage medium and the permission information stored in the storage unit. An application activating unit that activates the application when the determining unit determines to execute the application.

16 Claims, 15 Drawing Sheets

APPLICATION EXECUTING APPARATUS AND APPLICATION EXECUTION METHOD

CROSS-REFERENCE TO RELATED APPLICATIONS

The present document incorporates by reference the entire contents of Japanese priority document, 2006-031477 filed in Japan on Feb. 8, 2006.

BACKGROUND OF THE INVENTION

1. Field of the Invention

The present invention relates to an application executing apparatus and an application execution method for controlling execution of computer programs stored in an external media.

2. Description of the Related Art

Recently, there have been remarkable improvements in multifunctionality of image forming apparatuses and enhancement of their functions. Accordingly, image forming apparatuses can perform processing by using not only applications prestored in the apparatus body but also applications stored in a computer on a network or a storage medium.

Under such circumstances, there can be cases that an image forming apparatus is used for an application that is not originally assumed by an administrator. However, the administrator needs to prevent illegal uses of the apparatus; even when the apparatus is used by an application not prestored therein.

Under these circumstances, some techniques for preventing illegal uses of an image forming apparatus have been proposed. For example, in Japanese Patent Application Laid-Open No. 2001-306170, initialization can be performed only when a hardware key is attached.

As another example of the techniques, Japanese Patent Application Laid-Open No. 2004-110779 discloses a technique for referring to selection information indicating a place where an application is stored, thereby selectively executing a computer program stored in an image forming apparatus or an external storage medium. Accordingly, a necessary computer program can be selected and executed.

However, the techniques disclosed in Japanese Patent Application Laid-Open Nos. 2001-306170 and 2004-110779 do not assume a case that a plurality of image forming apparatuses is installed, or that a storage medium storing a computer program is used by a plurality of image forming apparatuses.

Specifically, when the technique described in Japanese Patent Application Laid-Open No. 2001-306170 is applied to a plurality of image forming apparatuses, it is conceivable to use a different hardware key for each image forming apparatus, or use a common hardware key for respective image forming apparatuses. Because such circumstances are not assumed in the patent application, there is a problem that, for example, it is difficult to execute a different application for each image forming apparatus by one storage medium.

Further, in the technique described in Japanese Patent Application Laid-Open No. 2004-110779, when the same computer program is stored in different storage media, with which only setting being different, appropriate restrictions cannot be set for each of the same computer program in one image forming apparatus.

SUMMARY OF THE INVENTION

It is an object of the present invention to at least partially solve the problems in the conventional technology.

According to an aspect of the present invention, an application executing apparatus includes a connecting unit configured to receive connection of an external storage medium that stores therein an application and first medium identification information unique to the external storage medium; a storage unit that stores therein permission information associated with the application and the first medium identification information, wherein the permission information indicates whether execution of corresponding application is to be permitted; a determining unit that determines whether to execute the application stored on the external storage medium based on the first medium identification information and the application stored on the external storage medium and the permission information stored in the storage unit; and an application activating unit that activates the application when the determining unit determines to execute the application.

According to an aspect of the present invention, an application execution method includes receiving connection of an external storage medium that stores therein an application and first medium identification information unique to the external storage medium; determining whether to execute the application stored on the external storage medium based on the first medium identification information and the application stored on the external storage medium, and permission information associated with the medium identification information and the application, indicating whether to permit execution of the application, and stored in a storage unit, wherein the permission information indicates whether execution of corresponding application is to be permitted; and activating the application when it is determined at the determining to execute the application.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained below while referring to the accompanying drawings. The invention is not to be limited by these embodiments.

Figure 1:
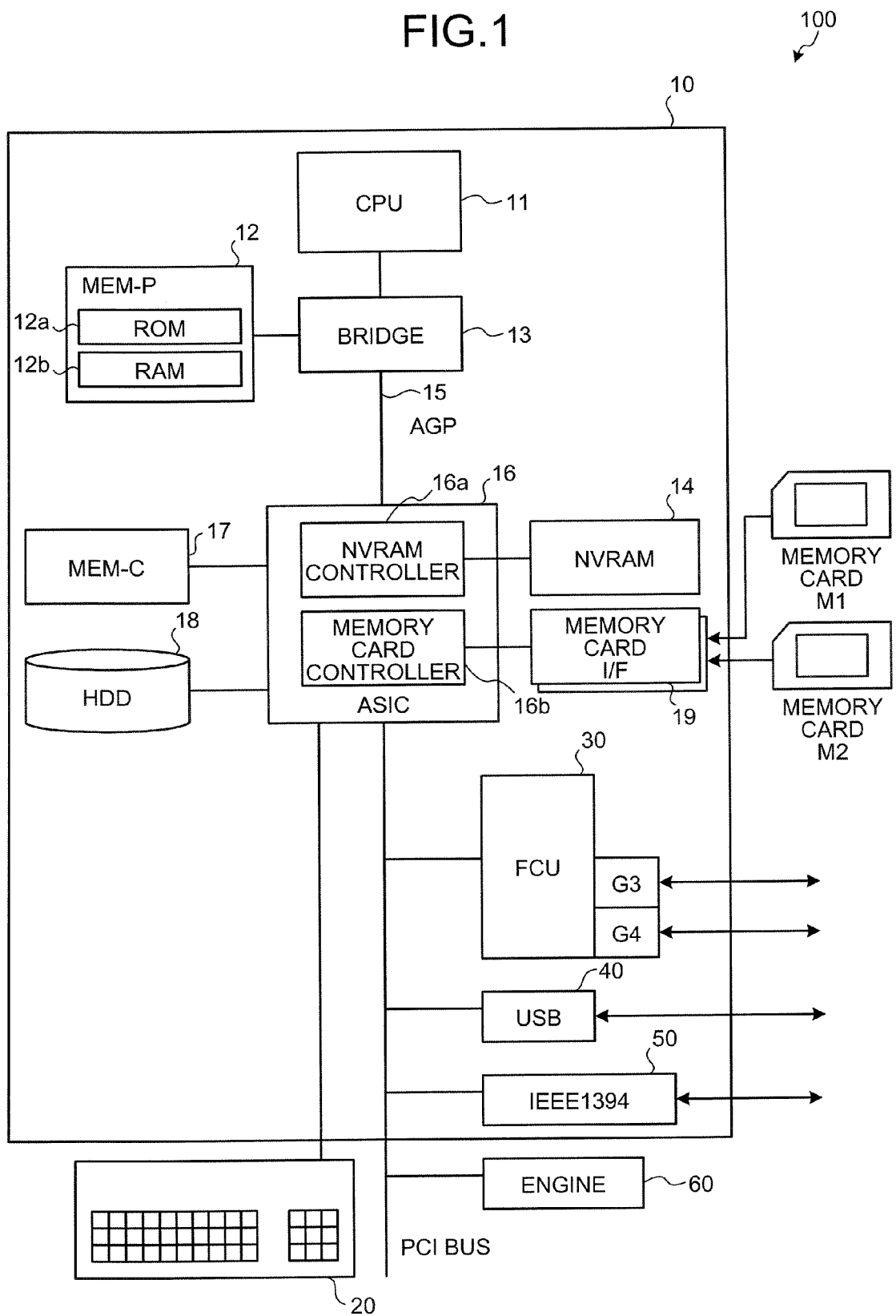
FIG. 1 is a block diagram of a hardware configuration of a multi function peripheral according to a first embodiment of the present invention.

FIG. 1 is a block diagram of a hardware configuration of a multi function peripheral 100 according to a first embodiment according to the present invention. As shown in FIG. 1, the multi function peripheral 100 has a configuration in which a controller 10 and an engine 60 are connected by a peripheral component interconnect (PCI) bus. The controller 10 controls the multi function peripheral 100, and controls drawing, communication, and input from an operating unit 20. The engine 60 is a printer engine or the like connectable to the PCI bus, and for example, a monochrome plotter, a one-drum color plotter, a four-drum color plotter, a scanner, or a fax unit. The engine 60 includes an image processing part for performing error diffusion, gamma conversion, and the like, in addition to a so-called engine part such as the plotter. The operating unit 20 includes an operation panel and the like.

The controller 10 includes a central processing unit (CPU) 11, a BRIDGE 13, a system memory (MEM-P) 12, a local memory (MEM-C) 17, an application specific integrated circuit (ASIC) 16, a hard disk drive (HDD) 18, a fax control unit (FCU) 30, a universal serial bus (USB) 40, and the Institute of Electrical and Electronics Engineers 1394 (IEEE 1394) interface 50.

The BRIDGE 13 and the ASIC 16 are connected by an accelerated graphics port (AGP) bus 15, and the ASIC 16 and the FCU 30, the USB 40 and the IEEE 1394 interface 50 are respectively connected by the PCI bus.

The MEM-P 12 further includes a read only memory (ROM) 12a and a random access memory (RAM) 12b.

The CPU 11 performs entire control of the multi function peripheral 100, includes a chipset formed of the BRIDGE 13 and the MEM-P 12, and is connected to other equipment via the chipset.

The BRIDGE 13 connects the CPU 11, the MEM-P 12, and the AGP 15 with each other, and includes a memory controller that controls read and write from/to the MEM-P 12, a PCI master, and an AGP target.

The MEM-P 12 is a system memory used as a storage memory for program and data, a developing memory for program and data, and drawing memory of a printer, and formed of the ROM 12a and the RAM 12b. The ROM 12a is used as the storage memory for programs and data, and the RAM 12b is a writable and readable memory used as the developing memory for programs and data, the drawing memory of the printer, and the like.

The ASIC 16 is an integrated circuit (IC) for image processing having a hardware component for image processing, and has a function as a bridge for respectively connecting the AGP 15, the PCI bus, the HDD 18, and the MEM-C 17. The ASIC 16 includes a PCI target, an AGP master, an arbiter (ARB) forming a core of the ASIC, a memory controller that controls the MEM-C 17, a plurality of direct memory access controllers (DMAC) that rotates image data by a hardware logic or the like, and a PCI unit that transfers data between the engine 60 and the ASIC 16 via the PCI bus.

The ASIC 16 further includes a nonvolatile random access memory (NVRAM) controller 16a and a memory card controller 16b.

The NVRAM controller 16a controls read and write of information for each bit relative to the NVRAM 14. The memory card controller 16b controls read and write of information relative to the memory card connected thereto via a memory card I/F 19.

The NVRAM 14 is a data storage memory readable and writable for each bit. The data stored in the NVRAM is described later.

The memory card I/F 19 indicates an interface or an insertion slot to the memory card (for example, a secure digital (SD) card), which is a detachable non-volatile medium. When the memory card is inserted into the slot, the insertion of the memory card can be recognized by a voltage change. In the multi function peripheral 100, a plurality of insertion slots is provided, so that a plurality of memory cards (for example, a memory card M1 and a memory card M2) can be simultaneously attached and read and write from/to these memory cards can be controlled.

The MEM-C 17 is a local memory used as a copying image buffer or a code buffer, and the HDD 18 is a storage unit for storing image data, programs, font data, and forms.

The AGP 15 is a bus interface for graphics accelerator card proposed for speeding up graphic processing and can make the graphics accelerator card high speed by directly accessing the MEM-P 12 with high throughput.

Figure 2:
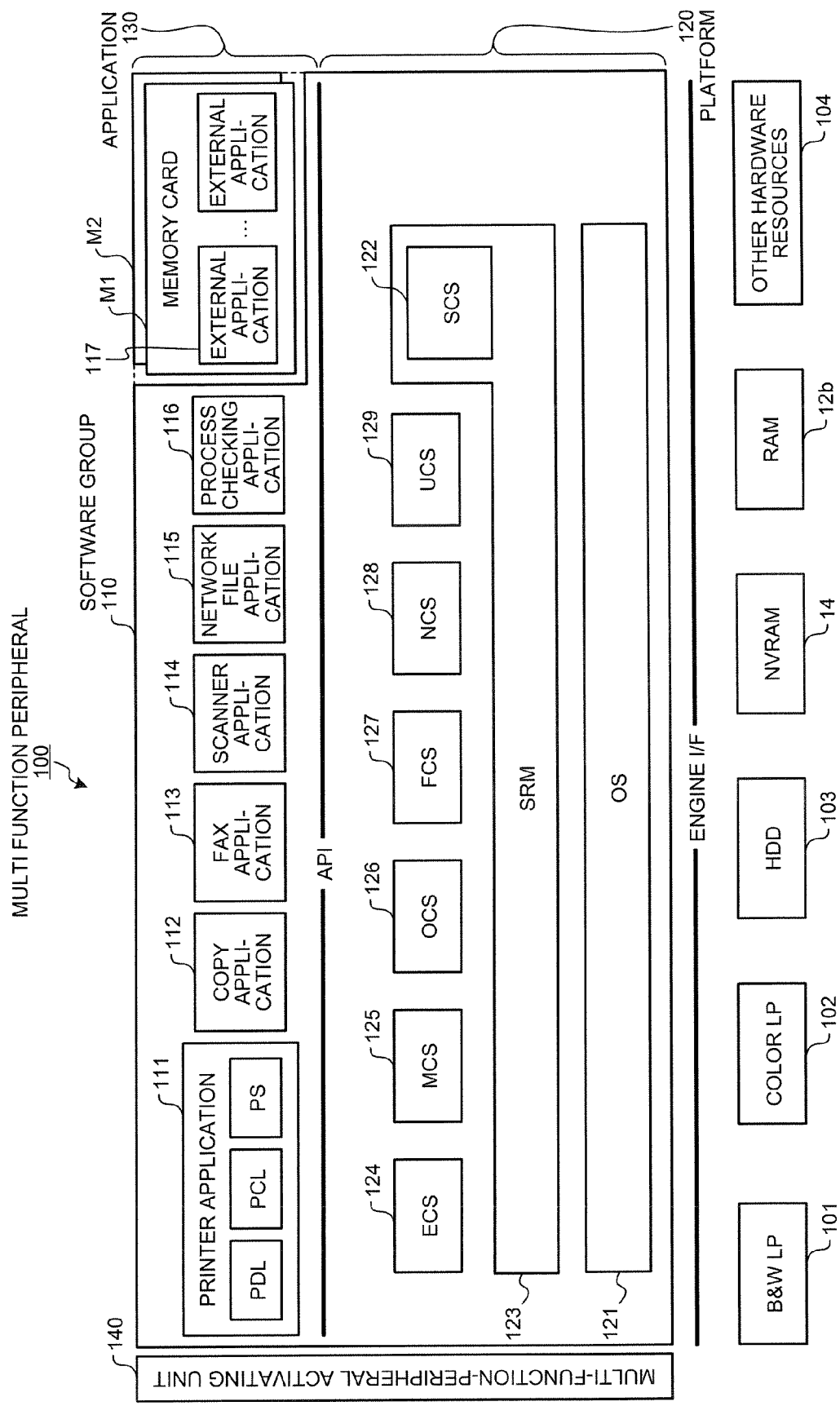
FIG. 2 is a block diagram of a configuration of the multi function peripheral according to the first embodiment.

FIG. 2 is a block diagram of the configuration of the multi function peripheral 100 according to the first embodiment. The multi function peripheral 100 determines whether an external application can be executed, when the memory card M1 or the like that stores therein the external application developed by the third party such as a customer or a third vender is attached after shipping the multi function peripheral 100. When it is determined that the external application can be executed, the multi function peripheral 100 mounts the external application on the RAM 12b to activate the external application.

As shown in FIG. 2, the multi function peripheral 100 includes a monochrome line printer (B&W LP) 101, a color line printer (color LP) 102, a hard disk device (HDD) 103, the NVRAM 14, the RAM 12b, hardware resources 104 such as a scanner, a facsimile, a memory, and a network interface, a software group 110, and a multi-function-peripheral activating unit 140. The software group 110 includes a platform 120 and an application 130.

The platform 120 includes a control service for generating a request for acquiring a hardware resource by interpreting a processing request from the application 130, a system resource administrator (hereinafter, SRM) 123 that manages at least one hardware resource to arbitrate the acquisition request from the control service, and an operating system (hereinafter, OS) 121.

The control service includes at least one service module such as a system control service (hereinafter, SCS) 122, an engine control service (hereinafter, ECS) 124, a memory control service (hereinafter, MCS) 125, an operation-panel control service (hereinafter, OCS) 126, a fax control service (hereinafter, FCS) 127, a network control service (hereinafter, NCS) 128, and a user-information control service (hereinafter, UCS) 129.

The platform 120 includes an application program interface (hereinafter, API) enabling reception of the processing request from the application 130 based on a function defined beforehand.

The OS 121 is a general purpose operating system such as the UNIX®, and executes in parallel the respective software of the platform 120 and the application 130 as a process.

A process of the SRM 123 controls the system together with the SCS 122 and manages the resources. For example, A process of the SRM 123 arbitrates upon reception of a request from an upper layer using the hardware resources such as the engine of the scanner and the printer, the memory, a hard disk device (HDD) file, a host I/O (centronics interface, network interface, IEEE 1394 interface, and RS 232C interface) to control the execution thereof.

Specifically, the SRM 123 determines whether the requested hardware resource is available (is not used by other requests). If it is available, the SRM 123 notifies the upper layer that the requested hardware resource is available. The SRM 123 performs use scheduling of the hardware resources in response to the request from the upper layer, to directly execute the request content such as paper transfer, imaging operations, ensuring of memory, file creation by, for example, the printer engine.

A process of the SCS 122 performs application management, control of the operating unit, system screen display, LED display, resource management, interrupt application control, and the like. Specific processing performed by the SCS 122 according to the first embodiment will be explained later.

A process of the ECS 124 controls the engine of the hardware resources 104 including the monochrome line printer (B&W LP) 101, the color line printer (color line printer) 102, the HDD 103, the NVRAM 14, the RAM 12*b*, the scanner, and the facsimile.

A process of the MCS 125 performs acquisition and release of the image memory, use of the HDD, compression and extension of the image data, and the like. A process of the OCS 126 controls the operation panel, which is an information transmitting unit between the operator and a body control.

Figure 3:
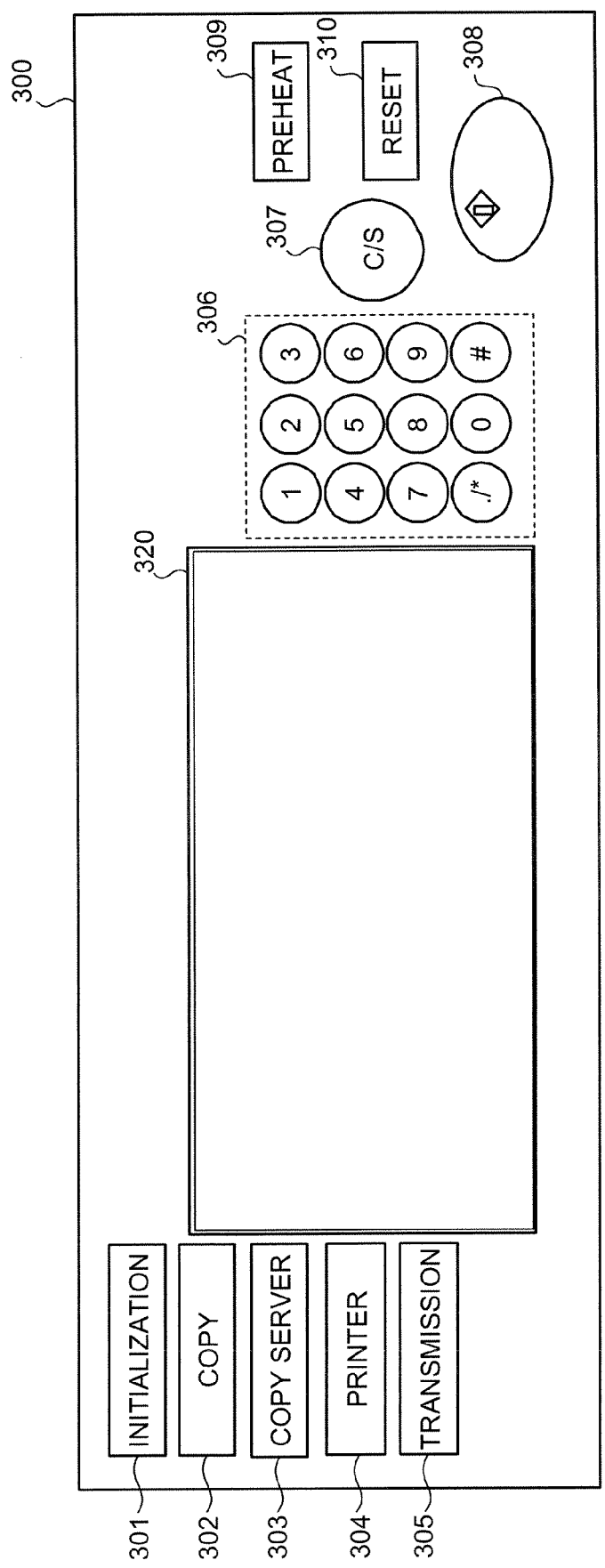
FIG. 3 is an example of an operation panel controlled by an OCS of the multi function peripheral according to the first embodiment.

FIG. 3 is an example of an operation panel 300 controlled by the OSC 126. As shown in FIG. 3, the operation panel 300 includes an initialization key 301, a copy key 302, a copy server key 303, a printer key 304, a transmission key 305, a ten key 306, a clear/stop key 307, a start key 308, a preheat key 309, a reset key 310, and a liquid-crystal touch panel 320.

When the initialization key 301 is touched, a menu for initialization is displayed on the liquid-crystal touch panel 320, and the paper size to be used and the like can be set in the menu. When a user wishes to make a copy, to accumulate the copy result in the multi function peripheral 1, to operate the printer, and to send a fax or the accumulated images, the user touches the copy key 302, the copy server key 303, the printer key 304, and the transmission key 305, respectively. A corresponding menu is then displayed on the liquid-crystal touch panel 320. A screen example to be displayed on the operation panel 300 having such a configuration will be described later.

Returning to FIG. 2, a process of the FCS 127 provides an application for performing fax transmission and reception using a PSTN or ISDN network from respective application layers in the system controller, registration/reference of various facsimile data managed by a backup static RAM (SRAM) (BKM), read of facsimile, printing of received facsimile, and integrated transfer.

A process of the NCS 128 provides commonly available service to an application requiring a network I/O, and distributes data received by respective protocols from the network side to respective applications, and arbitrates at the time of transmitting data from the application to the network side.

A process of the UCS 129 manages user information, and determines a memory in which user information corresponding to a request is stored, and obtains the user information from the determined memory to provide the user information to the respective applications.

The application 130 includes a printer application 111 which is an application for printer having a page description language (PDL), a printer control language (PCL), and postscript (PS), a copy application 112 which is an application for copying, a fax application 113 which is an application for a facsimile, a scanner application 114 which is an application for a scanner, a network file application 115 which is an application for a network file, and a process checking application 116 which is an application for process checking.

The respective processes of the application 130 and the respective processes of the control service realize user service relating to image forming processes of the copying machine, printer, scanner, and facsimile, while performing communications, between the processes by performing function call, transmission of a returned value, and transfer of a message.

Thus, a plurality of the applications 130 and a plurality of control services are present in the multi function peripheral 100 according to the first embodiment, and respectively operate as processes. At least one thread is generated in the respective processes and parallel execution is performed in a unit of thread. The control service offers common service to the application 130. Therefore, these processes provide user service relating to the image forming processes of the copying machine, printer, scanner, and facsimile, while performing a parallel operation, a parallel operation of the threads, and communications between processes, to perform a cooperative operation.

When the memory card M1 is attached, the multi function peripheral 100 loads the external application 117 stored on the memory card M1 onto an application layer above a control service layer, so as to enable execution thereof. FIG. 2 is an example where the memory card M1 is attached and the external application 117 is loaded.

The multi-function-peripheral activating unit 140 is activated first at the time of power on of the multi function peripheral 100 to activate the application 130 and the platform 120. For example, the multi-function-peripheral activating unit 140 reads the control service program or the application program from the HDD 103, and transfers the read programs to the memory area secured on the SRAM or a synchronous dynamic RAM (SDRAM) to activate these programs. At this time, the multi-function-peripheral activating unit 140 determines whether the external application 117 stored on the memory card M1 is to be activated.

Figure 4:
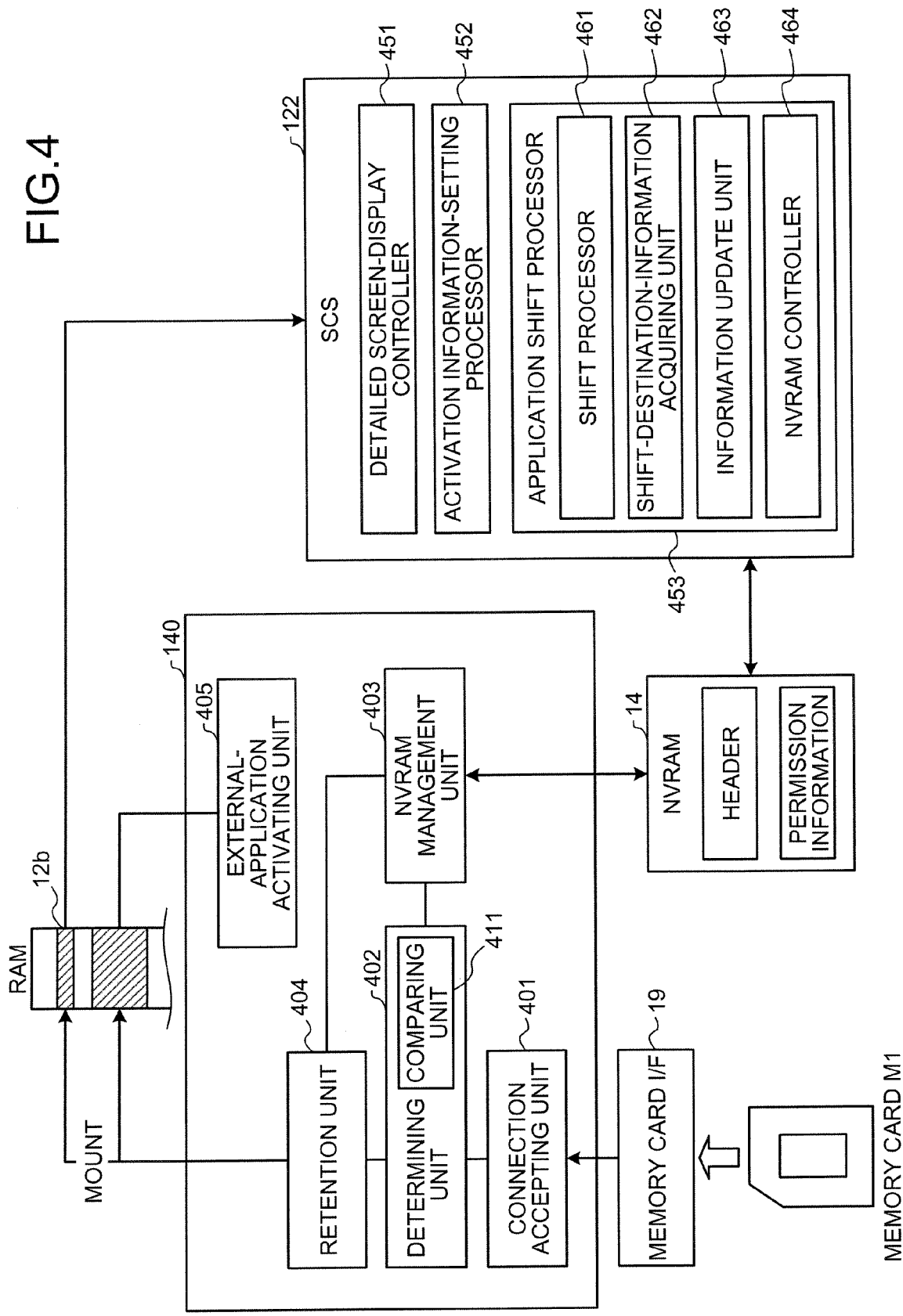
FIG. 4 is a block diagram of a functional configuration of a multi-function-peripheral activating unit and a SCS of the multi function peripheral according to the first embodiment.

The configuration for activating the external application of the multi-function-peripheral activating unit 140 is explained next. FIG. 4 is a block diagram of a functional configuration of the multi-function-peripheral activating unit 140 and the SCS 122 of the multi function peripheral 100 according to the first embodiment. The multi-function-peripheral activating unit 140 includes a connection accepting unit 401, a determining unit 402, an NVRAM management unit 403, a retention unit 404, and an external-application activating unit 405. The multi-function-peripheral activating unit 140 activates the external application 117 stored on the memory card M1 attached to the memory card I/F 19 at the time of initialization of the multi function peripheral 100, according to the permission information stored in the NVRAM 14. The configurations of the memory card M1 and the NVRAM 14 are explained.

Figure 5:
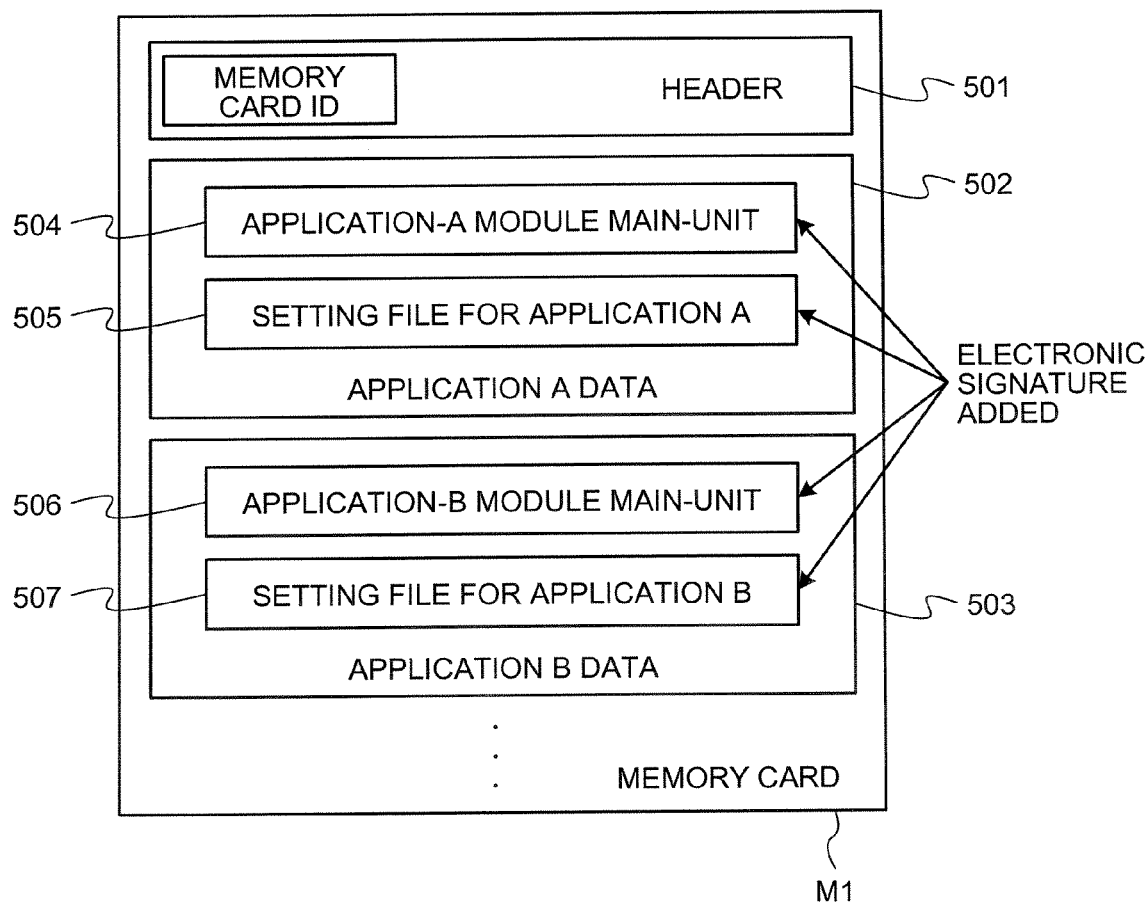
FIG. 5 is a block diagram of an example of data stored on a memory card.

FIG. 5 is a block diagram of an example of data stored on the memory card M1. The memory card M1 is formed of a header 501 and data for each application (for example, application A data 502, application B data 503).

The header 501 includes a memory card ID. The memory card ID is unique for each memory card, and is used when the multi function peripheral 100 identifies the memory card.

As shown in FIG. 5, the data for each application stored on the memory card M1 includes a module main unit (for example, an application-A module main-unit 504 and an application-B module main-unit 506), and a setting file for the application (for example, a setting file 505 for the application A and a setting file 507 for the application B), of the external application 117.

The setting file for each external application 117 stores a mount point when the module main unit is mounted on the RAM 12b or setting such as an activation option, priority at the time of activating the module.

An electronic signature is added to the module main unit and the setting file. It is assumed that the electronic signature is unique for each memory card.

The connection accepting unit 401 performs collation of the module main unit and the setting file by using the added electronic signature, when the connection of the memory card M1 is accepted. As a result, switching or the like of a file stored on the memory card M1 can be prevented. Further, because the electronic signature is added, falsification of the module main unit and the setting file can be detected. Accordingly, illegal uses which are not originally assumed by the administrator can be prevented.

Although different from the first embodiment, the configuration can be such that these module main units and setting files are encrypted, and only when collation is performed by the electronic signature, decryption is performed. Accordingly, execution of the application stored on the memory card M1 can be prevented in an image forming apparatus that cannot perform collation by the electronic signature.

Figure 6:
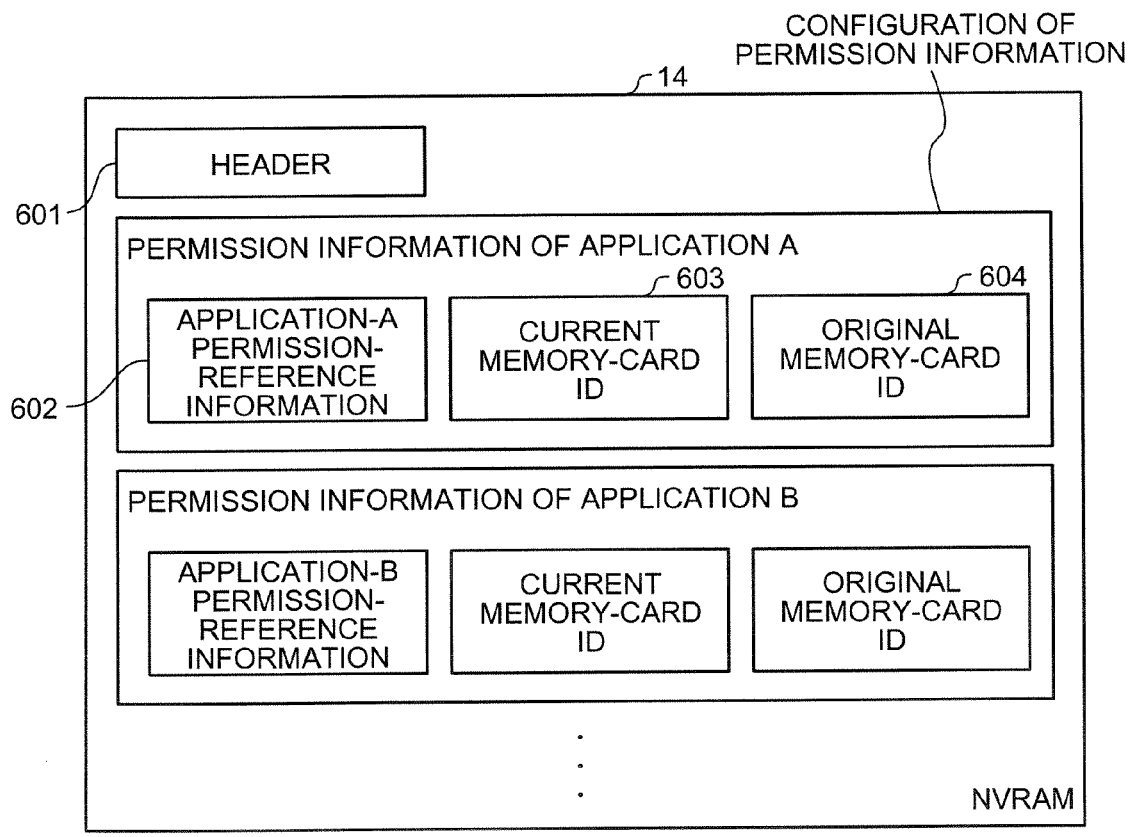
FIG. 6 is a block diagram of an example of data stored in an NVRAM of the multi function peripheral according to the first embodiment.

FIG. 6 is a block diagram of an example of data stored in the NVRAM 14. The NVRAM 14 is formed of a header 601 and the permission information for each application. The permission information is held for each application, activation of which is permitted by the administrator.

The header 601 stores the setting information used by the multi function peripheral 100. Examples of the setting information include a flag of an application control mode and the like used at the time of activating the external application 117. The flag of the application control mode and the like are explained later.

An example of information stored in the NVRAM 14 is explained for the application A, which is the external application 117. As shown in FIG. 6, the NVRAM 14 stores therein application-A permission-reference information 602, a current memory-card ID 603, and an original memory-card ID 604, as the permission information of the application A. It is assumed here that the application-A permission-reference information 602 is information obtained by combining the information of the application A stored on the memory card and the information of the memory card M1. The memory card information is unique information for each memory card, and the application information is unique information for each application. Details of the memory card information and the application information are explained below.

In the first embodiment, it is assumed that the memory card information is a unique memory-card ID for each memory card. Likewise, the application information is a message digest extracted from the application name, the update date of the file, the last access date, the module main unit, and the setting file, by using a hash function or the like.

Accordingly, when the memory card M1 is attached, the information of the application A stored on the memory card and the information of the memory card M1 are acquired, the acquired information is combined, and the combined information and the application-A permission-reference information 602 are compared with each other, to determine whether activation of the application is permitted. An example where activation of the application is not permitted is explained next. For example, when all the pieces of information stored on the memory card M1 are copied onto another memory card, the memory card information (that is, the memory card ID) of the memory card as the copy destination and that of the memory card as the copy source are naturally different. Therefore, even when the memory card information and the information of the application A are combined, the combined information of the memory card as the copy destination does not match the application-A permission-reference information 602, and hence activation of the application A is not permitted.

Although not shown, the NVRAM 14 stores therein a public key used for collation of the electronic signature for each memory card to be attached. Accordingly, authentication of the electronic signature added to the module main unit stored on the memory card and the setting file can be performed.

In the first embodiment, the respective data are stored in the NVRAM 14; however, the data can be stored on other recording media, regardless of a nonvolatile memory or an HDD.

Returning to FIG. 4, the connection accepting unit 401 accepts the memory card connected via the memory card I/F 19. When the connection accepting unit 401 determines that the memory card is connected, processing described later is performed.

The connection accepting unit 401 authenticates the electronic signature added to the module main unit and the setting file of the memory card by using the public key corresponding to the memory card stored in the NVRAM 14, at the time of accepting the memory card. Only when authentication is performed properly, the processing described later is performed. Accordingly, switching of the module main unit and the setting file can be prevented.

The NVRAM management unit 403 reads and writes the setting content of the data stored in the NVRAM 14. Specifically, the NVRAM management unit 403 reads the flag of the application control mode in the header in the NVRAM 14 to determine whether activation of the external application is to be suspended.

The flag of the application control mode stores a flag indicating one mode selected from three types of modes, that is, "all setting", "automatic setting", and "no setting". "All setting" is a mode for determining whether to activate the application according to the permission information stored in the NVRAM 14, for all applications stored on the memory card. "Automatic setting" is a mode in which an activation setting level set for all applications is compared with an activation permission level set by the administrator, and activation of the application having the activation setting level higher than the activation permission level is permitted. "No setting" is a mode for permitting activation of all the applications.

The application control mode and the activation permission level are stored as the header information in the NVRAM 14. The activation setting level for each application is stored in the setting file for each application of the memory card.

Figure 7:
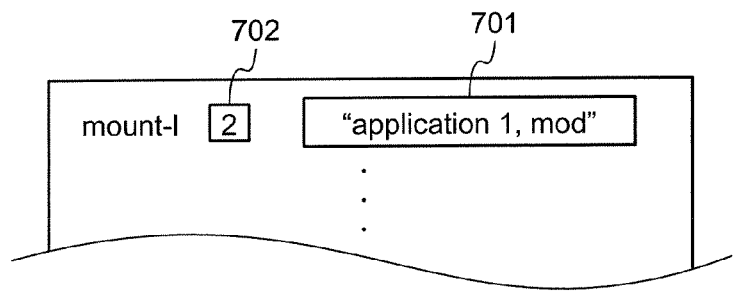
FIG. 7 is a description example of a setting file for each application stored on the memory card.

FIG. 7 is a description example of the setting file for each application. As shown in FIG. 7, a command to be performed at the time of mounting the module 701 is described in the setting file, and the activation setting level is set in an option 702 of the command.

Returning to FIG. 4, the NVRAM management unit 403 instructs the retention unit 404 so as to mount all the applications stored on the memory card M1, when the flag of the application control mode is "no setting".

When the flag of the application control mode is "automatic setting", the NVRAM management unit 403 refers to the setting file for each application on the memory card M1 after reading the activation permission level stored in the header in the NVRAM 14, to specify an application in which the activation setting level higher than the activation permission level is set, and instructs the retention unit 404 to mount the specified application.

The NVRAM management unit 403 instructs the determining unit 402 to determine the application to be mounted, when the flag of the application control mode is "all setting". At this time, the NVRAM management unit 403 outputs the permission information stored in the NVRAM 14 to the determining unit 402.

Setting of the flag of the application control mode and the activation permission level is performed by the SCS 122. The procedure until setting by the SCS 122 will be described later.

The determining unit 402 includes a comparing unit 411, and determines the application to be mounted, upon reception of instruction from the NVRAM management unit 403. The determining unit 402 acquires the memory card ID and the application information, which is specific information for each application, stored on the memory card M1. The determining unit 402 then outputs the permission information input from the NVRAM management unit 403, and the acquired memory card ID and application information to the comparing unit 411. The determining unit 402 determines whether to permit mounting of application for each application, based on the comparison result performed by the comparing unit 411.

The comparing unit 411 generates information for each application by combining the acquired memory card ID and application information, and compares the combined information with the application-permission reference information included in the input permission information. The comparing unit 411 then outputs the comparison result to the determining unit 402.

The determining unit 402 determines that the application can be mounted when these pieces of information match each other based on the comparison result of the comparing unit 411, and instructs the retention unit 404 to mount the application.

The retention unit 404 mounts the application instructed by the determining unit 402 or the NVRAM management unit 403 on the RAM 12b. The retention unit 404 reads the setting file of the application to be mounted from the memory card M1 at the time of mounting, and mounts the application according to the mount point or the like set by the setting file.

The retention unit 404 expands the detailed information and the like of all the applications stored on the memory card M1 on the RAM 12b, regardless of the instruction from the determining unit 402 and the NVRAM management unit 403. Accordingly, all the applications stored on the memory card M1 and an explanation of the application can be displayed on the operation panel 300. As a result, the administrator can set which application is permitted to be activated by the SCS 122 by referring to and operating the operation panel 300. The screen example displayed at this time will be described later.

The external-application activating unit 405 activates all the applications mounted by the retention unit 404.

The multi function peripheral 100 according to the first embodiment has the configuration described above, and can suspend the activation of the external application 117 by the permission information stored in the NVRAM 14.

Figure 8:
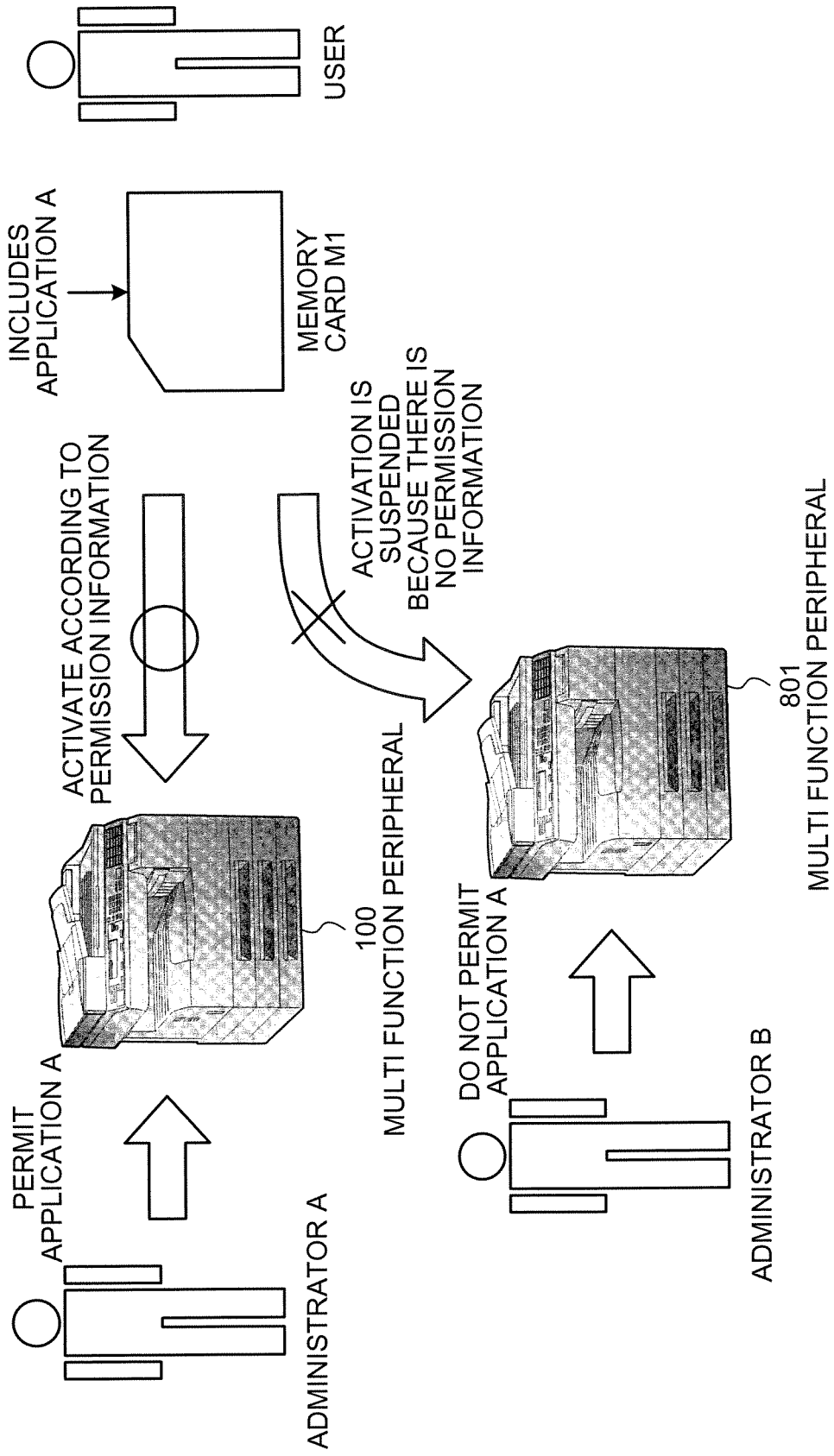
FIG. 8 is a schematic for explaining an example of activation control of an application stored on the memory card according to the first embodiment.

FIG. 8 is a schematic for explaining an example of activation control of the application A stored on the memory card M1 according to the first embodiment. As shown in FIG. 8, because it is set such that administrator A permits the application A stored on the memory card M1 in the multi function peripheral 100, permission information of the application A is stored in the NVRAM 14. Therefore, when a user mounts the memory card M1 on the multi function peripheral 100, the user can use the application A.

On the other hand, in a multi function peripheral 801, administrator B does not permit the application A stored on the memory card. Therefore, the permission information of the application A is not stored in the NVRAM 14 of the multi function peripheral 801. Accordingly, when a user mounts the memory card M1 on the multi function peripheral 801, the user cannot use the application A. In this manner, in the first embodiment, the application can be activated according to the setting by the administrator for each multi function peripheral.

Returning to FIG. 4, the SCS 122 includes a detailed screen-display controller 451, an activation information-setting processor 452, and an application shift processor 453.

The detailed screen-display controller 451 controls display of a screen for changing the application control mode on the operation panel 300 or a screen for setting whether to activate each application stored on the memory card M1 currently mounted on the multi function peripheral 100.

The activation information-setting processor 452 updates setting performed by a user on a screen displayed by the detailed screen-display controller 451 in the NVRAM 14 or the like.

Figure 9:
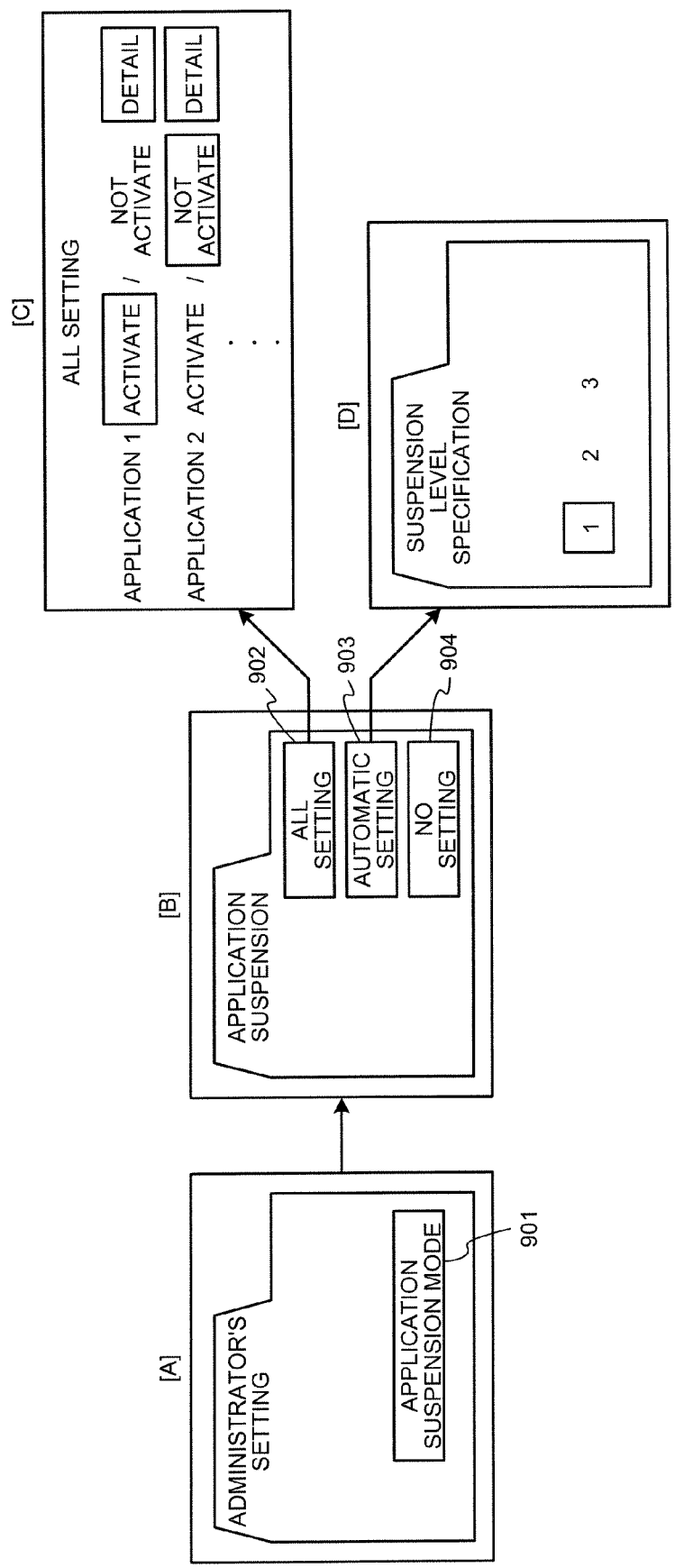
FIG. 9 is a schematic for explaining a transition of screen displayed on a liquid-crystal touch panel by a detailed screen-display controller in the SCS of the multi function peripheral according to the first embodiment.

FIG. 9 is a schematic for explaining a transition of a screen displayed on the liquid-crystal touch panel 320 by the detailed screen-display controller 451. In FIG. 9(A), a screen example when the administrator logs in the multi function peripheral 100 is shown. When the administrator presses an "application suspension mode" button 901 in the screen example, the detailed screen-display controller 451 displays a change screen for the application suspension mode.

FIG. 9(B) is a screen example when the detailed screen-display controller 451 changes the application suspension mode to be displayed. The administrator selects any one of three types of modes (all setting, automatic setting, no setting) shown in FIG. 9(B). When a "no setting" button 904 is pressed, the activation information-setting processor 452 changes the flag of the application control mode stored in the NVRAM 14 so that activation of all the applications stored on the memory card is permitted.

When the "all setting" button 902 is pressed in FIG. 9(B), the detailed screen-display controller 451 displays a list screen of applications stored in the NVRAM 14 shown in FIG. 9(C). When the administrator selects "activate" in the displayed application, the activation information-setting processor 452 generates the permission information of the application and stores therein the permission information in the NVRAM 14. The activation information-setting processor 452 also updates the flag of the application control mode to "all setting". When the administrator changes the selection from "activate" to "not activate" in the predetermined application, the activation information-setting processor 452 deletes the permission information of the application from the NVRAM 14.

When the "automatic setting" button 903 is pressed in FIG. 9(B), the detailed screen-display controller 451 displays a setting screen of the activation permission level at the time of activating the application shown in FIG. 9(D). The activation information-setting processor 452 performs processing for updating with the activation permission level set by the administrator and processing for updating the application control mode to "automatic setting" with respect to the NVRAM 14.

Returning to FIG. 4, the application shift processor 453 includes a shift processor 461, a shift-destination-information acquiring unit 462, an information update unit 463, and an NVRAM controller 464. The application shift processor 453 shifts the application stored on the memory card onto another memory card. In this case, it is assumed that two memory cards are mounted on the memory card I/F 19 of the multi function peripheral 100. In the explanations below, a case that the application is shifted from the memory card M1 to a memory card M2 is explained.

The shift processor 461 acquires application information (module main unit and setting file) stored on the memory card M1 to write the acquired apparatus information on the memory card M2. The shift-destination-information acquiring unit 462 acquires a memory card ID of the memory card M2, which is a write destination.

The MVRAM controller 464 reads the permission information of the application, which is an object to be shifted, from the MVRAM 14. The NVRAM controller 464 writes the permission information updated by the information update unit 463 in the NVRAM 14.

The information update unit 463 changes the permission information read from the NVRAM 14 so that the permission information can be used in the shifted application. Specifically, the information update unit 463 changes the current memory-card ID stored as the permission information to an ID of the memory card as the shift destination. The original memory-card ID is stored as the original memory-card ID stored in the permission information. Application-permission reference information is newly generated by using the memory card ID at the shift destination. The changed permission information is written as the permission information of the application shifted by the NVRAM controller 464.

Accordingly, even when the application is shifted to a different memory card, it can be controlled whether to suspend the activation of the application. In other words, even when an external application is shifted to another desired memory card in response to a user's request, execution of the external application stored on the other memory card can be reliably controlled.

After the setting is performed, the multi function peripheral 100 is restarted, thereby enabling processing in a state with the setting being reflected.

After the application is shifted, when it is desired to authenticate the electronic signature added to the application, the connection accepting unit 401 performs authentication by using a public key corresponding to the original memory card. This is because the electronic signature cannot be changed, since the multi function peripheral 100 does not hold a secret key at the time of shift. As shown in FIG. 6, however, because the original memory-card ID is held in the NVRAM 14 for each application, the connection accepting unit 401 can specify the public key to be used for authentication.

Figure 10:
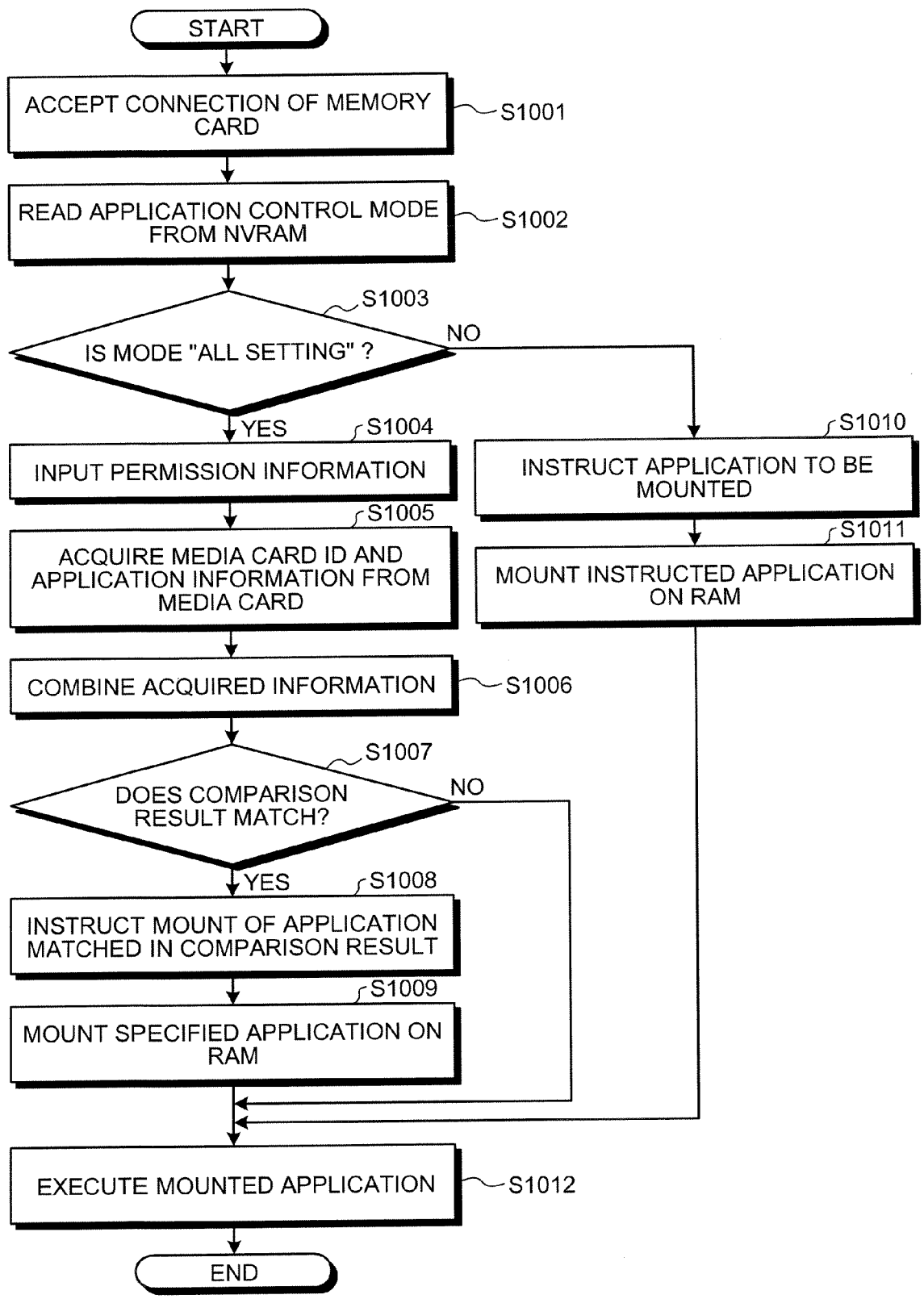
FIG. 10 is a flowchart of a process procedure performed in the multi function peripheral according to the first embodiment, from attachment of the memory card to execution of the application stored on the memory card.

Processing from attachment of the memory card M1 to execution of the application stored on the memory card M1 in the multi function peripheral 100 according to the first embodiment is explained. FIG. 10 is a flowchart of a process procedure performed in the multi function peripheral 100 according to the first embodiment.

The connection accepting unit 401 accepts the memory card M1 attached by the user (step S1001).

The NVRAM management unit 403 reads the flag of the application control mode stored in the header in the NVRAM 14 (step S1002). The NVRAM management unit 403 then determines whether the read flag of the application control mode is "all setting" (step S1003).

When the NVRAM management unit 403 determines that the flag of the application control mode is "all setting" (YES at step S1003), the determining unit 402 inputs the permission information from the NVRAM management unit 403 (step S1004). It is assumed here that the permission information is acquired by the NVRAM management unit 403 from the NVRAM 14.

The determining unit 402 acquires the application information (for example, an application name, an update date, a last access date, message and digest generated from the module main unit and the setting file, and the like) for each of the media card ID and the stored application from the attached media card M1 (step S1005).

The comparing unit 411 then combines the acquired media card ID and the application information (step S1005). The comparing unit 411 compares whether the combined information matches the permission reference information included in the permission information corresponding to the application (step S1007).

When the comparison result by the comparing unit 411 indicates a match (YES at step S1007), the determining unit 402 instructs the retention unit 404 to mount the application (step S1008). As a result, the retention unit 404 mounts the application on the RAM 12b according to the setting file of the instructed application (step S1009).

When the comparison result by the comparing unit 411 does not indicate a match (NO at step S1007), the determining unit 402 does not mount the application for suspending activation of the application. Although not shown, the processing from step S1005 to step S1009 is repeated by the number of applications stored on the media card M1. Accordingly, it is confirmed whether to activate all the applications stored on the media card M1.

When it is determined that the flag of the application control mode is not "all setting" (NO at step S1003), the NVRAM management unit 403 instructs the retention unit 404 to mount the application stored on the media card M1 according to the flag of the application control mode (step S1010). Specifically, when the application control mode is "no setting", the NVRAM management unit 403 instructs the retention unit 404 to mount all the applications stored on the media card M1.

When the application control mode is "automatic selection", the NVRAM management unit 403 refers to the activation permission level stored in the NVRAM 14 and refers to the setting file for each application stored on the media card M1. The NVRAM management unit 403 instructs the retention unit 404 to mount the application specified by the setting file, only when the activation setting level described in the setting file is higher than the activation permission level.

The retention unit 404 mounts the application instructed by the NVRAM management unit 403 on the RAM 12b according to the setting file of the application (step S1011).

The external-application activating unit 405 activates the application mounted on the RAM 12b (step S1012).

By performing the processing in this manner, only the application set for each media card can be activated according to the setting made by the administrator.

Further, illegal execution of the application by other multi function peripherals can be prevented.

In the first embodiment, the memory card ID is used as the information for identifying the memory card, however, any information can be used, so long as the information is for individually identifying the external storage medium such as the memory card.

In the first embodiment, when the application control mode is "all setting", only when the information obtained by combining the media card ID and the application information matches the permission reference information, the application area is retained on the RAM 12b and the application is executed. Accordingly, execution of the external application stored on the memory card can be controlled appropriately for each apparatus.

Further, in the first embodiment, because the external application, the execution of which is not permitted, is not mounted on the RAM 12b, the memory area of the RAM 12b can be effectively used.

When the application control mode is "automatic setting", it is determined whether to execute the application corresponding to the activation setting level set for each application. Therefore, activation of the application can be appropriately controlled according to the property of the application.

In the first embodiment, activation of the application stored on the memory card is suspended at the time of mounting the application. However, the present invention is not limited thereto. In a second embodiment of the present invention, therefore, an example where activation of the application is suspended at a different stage is explained.

Figure 11:
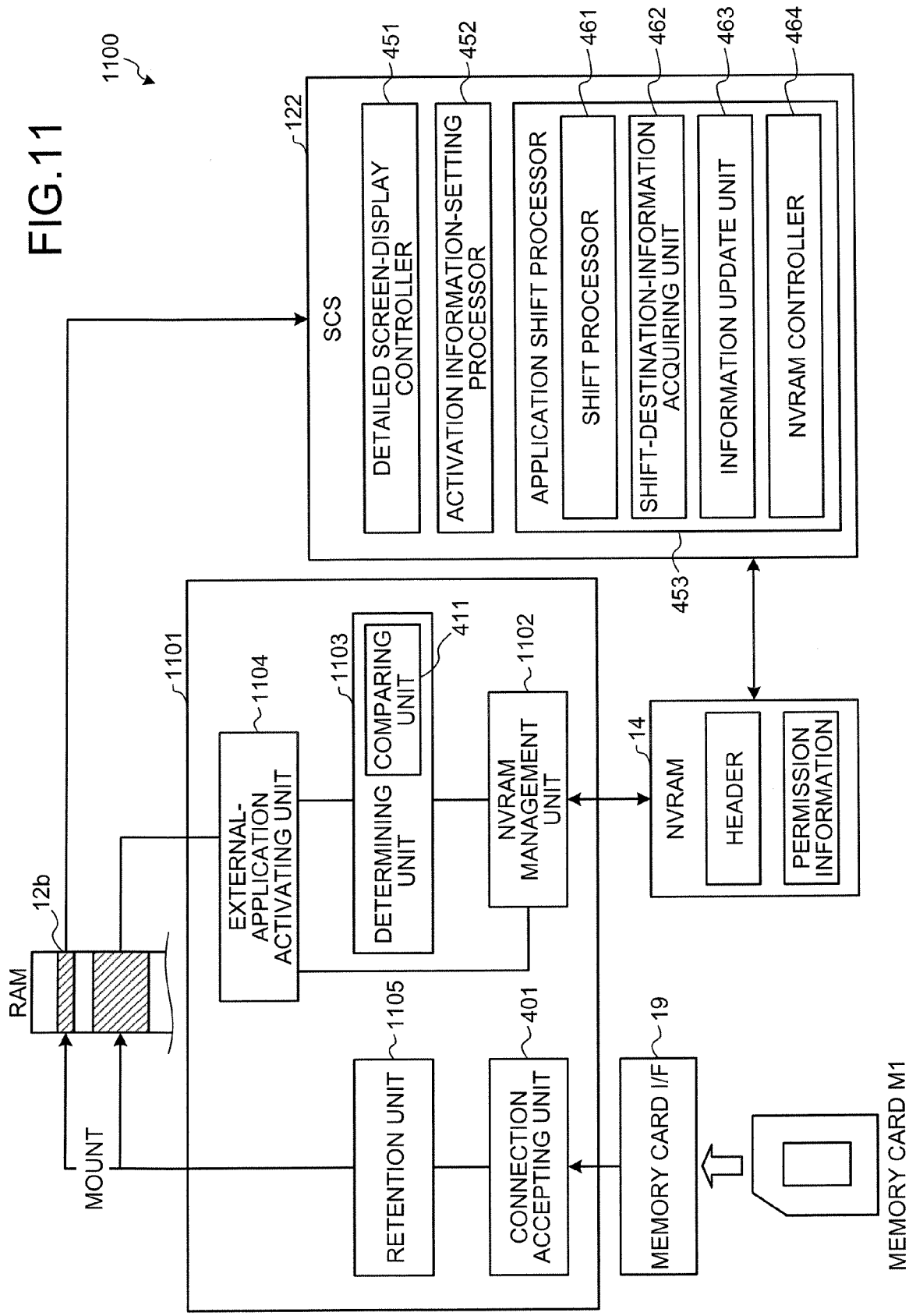
FIG. 11 is a block diagram of a configuration of a multi-function-peripheral activating unit and a SCS of the multi function peripheral according to a second embodiment of the present invention.

FIG. 11 is a block diagram of a configuration of a multi-function-peripheral activating unit 1101 and the SCS 122 of a multi function peripheral 1100 according to the second embodiment. The multi function peripheral 1100 is different from the multi function peripheral 100 according to the first embodiment in that the multi-function-peripheral activating unit 140 is changed to the multi-function-peripheral activating unit 1101 having different processing. In the explanations below, the configuration same as that of the first embodiment will not be explained, and like reference numerals refer to like constituent elements in the first embodiment.

As shown in FIG. 11, the multi-function-peripheral activating unit 1101 is different from the multi-function-peripheral activating unit 140 in that the NVRAM management unit 403 is changed to a NVRAM management unit 1102 having different processing, the determining unit 402 is changed to a determining unit 1103 having different processing, the retention unit 404 is changed to a retention unit 1105 having different processing, and the external-application activating unit 405 is changed to an external-application activating unit 1104 having different processing.

The retention unit 1105 mounts all the applications stored on the memory card M1 attached to the multi-function-peripheral activating unit 1101. This processing is performed regardless of whether the application is executed by the multi-function-peripheral activating unit 1101. The application, which has not been authenticated as legal in the authentication using the electronic signature by the connection accepting unit 401, is not mounted. Other processes of the retention unit 1105 are the same as those of the retention unit 404, and explanations thereof will be omitted.

The NVRAM management unit 1102 is different from the NVRAM management unit 403 in that it reads the flag of the application control mode stored in the header in the NVRAM 14 at the time of mounting the memory card, and gives an instruction to the external-application activating unit 1104 when the flag is "automatic setting" or "no setting". Because other processes of the NVRAM management unit 1102 such as calling the determining unit 1103 when the flag of the application control mode is "all setting" is the same as the NVRAM management unit 403, explanations thereof will be omitted.

The determining unit 1103 instructs the external-application activating unit 1104 to execute the application, a match of which is shown in the comparison result, after comparison for each application performed by the comparing unit 411 in the same manner as in the first embodiment.

The external-application activating unit 1104 activates only the application instructed by the NVRAM management unit 403 or the determining unit 402, of all the applications mounted on the RAM 12b.

Figure 12:
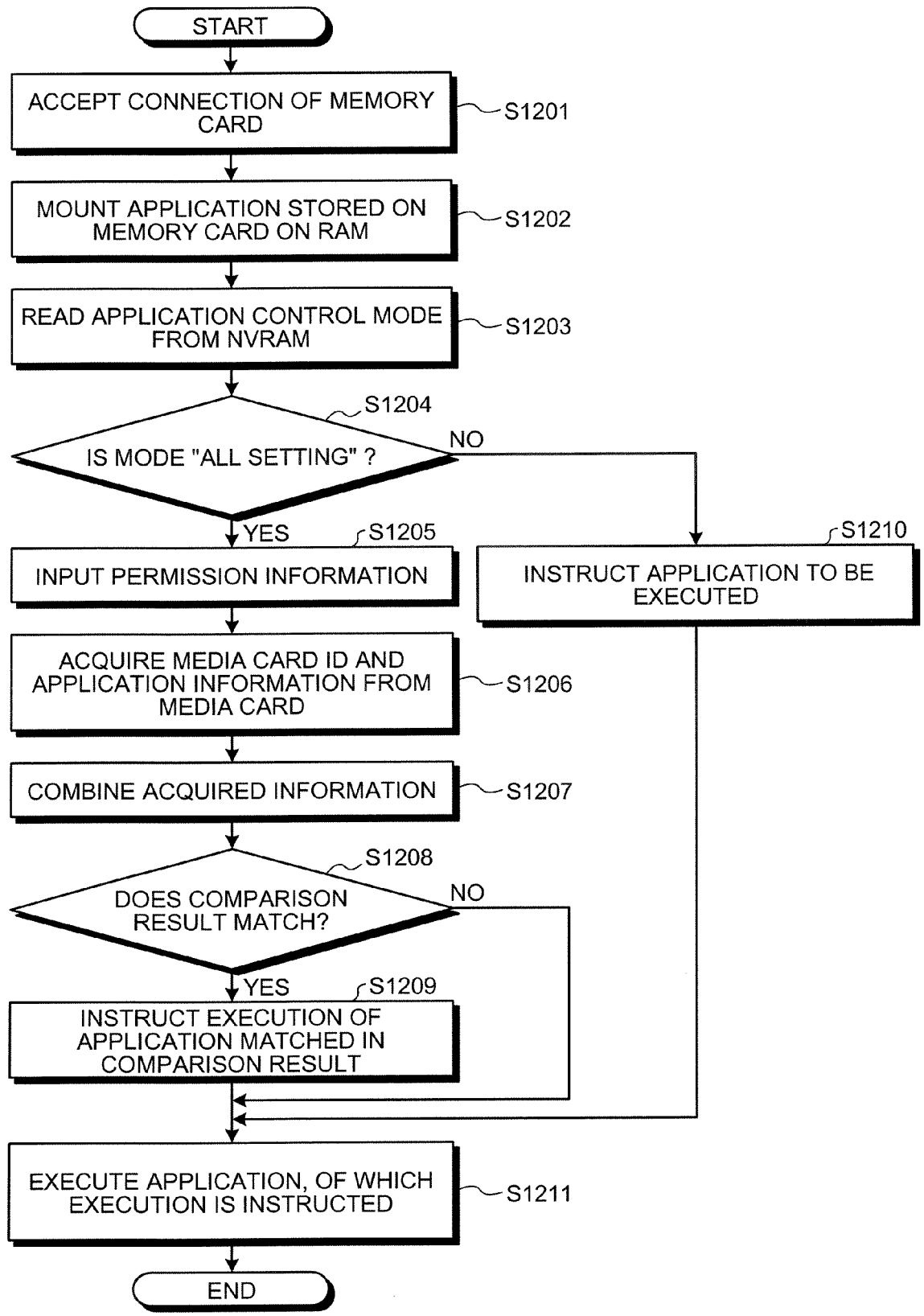
FIG. 12 is a flowchart of a process procedure performed in the multi function peripheral according to the second embodiment, from attachment of a memory card to execution of an application stored on the memory card.

The processing from attachment of the memory card M1 to execution of the application stored on the memory card M1 in the multi function peripheral 1100 according to the second embodiment is explained next. FIG. 12 is a flowchart of a process procedure performed in the multi function peripheral 1100 according to the second embodiment.

First, the connection accepting unit 401 accepts the memory card M1 attached by a user (step S1201).

The retention unit 1105 mounts all the applications stored on the memory card M1 on the RAM 12b according to the setting file stored for each application (step S1202).

The NVRAM management unit 1102 reads the flag of the application control mode stored in the header in the NVRAM 14 (step S1203). The NVRAM management unit 1102 then determines whether the read flag of the application control mode is "all setting" (step S1204).

When the NVRAM management unit 1102 determines that the flag of the application control mode is "all setting" (YES at step S1204), the determining unit 1103 inputs the permission information from the NVRAM management unit 1102 (step S1205).

The determining unit 1103 acquires the media card ID and the application information for each stored application from the attached media card M1 (step S1206).

The comparing unit 411 combines the acquired media card ID and the application information (step S1207). The comparing unit 411 then compares the combined information with the permission reference information included in the permission information associated with the application (step S1208).

When the comparison results by the comparing unit 411 indicates a match (YES at step S1208), the determining unit 1103 instructs the external-application activating unit 1104 to execute the application (step S1209).

When the comparison results by the comparing unit 411 does not indicate a match (NO at step S1208), the determining unit 1103 does not mount the application for suspending activation of the application. Although not shown, the processing from step S1206 to step S1209 is repeated by the number of applications stored on the media card M1.

When it is determined that the flag of the application control mode is not "all setting" (NO at step S1204), the NVRAM management unit 1102 instructs the external-application activating unit 1104 to execute the application stored on the media card M1 according to the flag of the application control mode (step S1210). The procedure for specifying the application to be executed is the same as the procedure for specifying the application to be mounted at step S1010 in the first embodiment, therefore, explanations thereof will be omitted.

The external-application activating unit 1104 activates the application, execution of which is instructed (step S1211).

By performing such processing, only the application set for each media card can be activated according to the setting made by the administrator. In the second embodiment, because only the application set for each media card can be executed, the same effect as that of the first embodiment can be obtained.

In the first and second embodiments, when the NVRAM included in the multi function peripheral 100 is replaced, the permission information is not stored in the replaced NVRAM, and hence the application stored on the memory card cannot be activated. Therefore, in a third embodiment of the present invention, a case that the permission information is activated on a memory card is explained.

Figure 13:
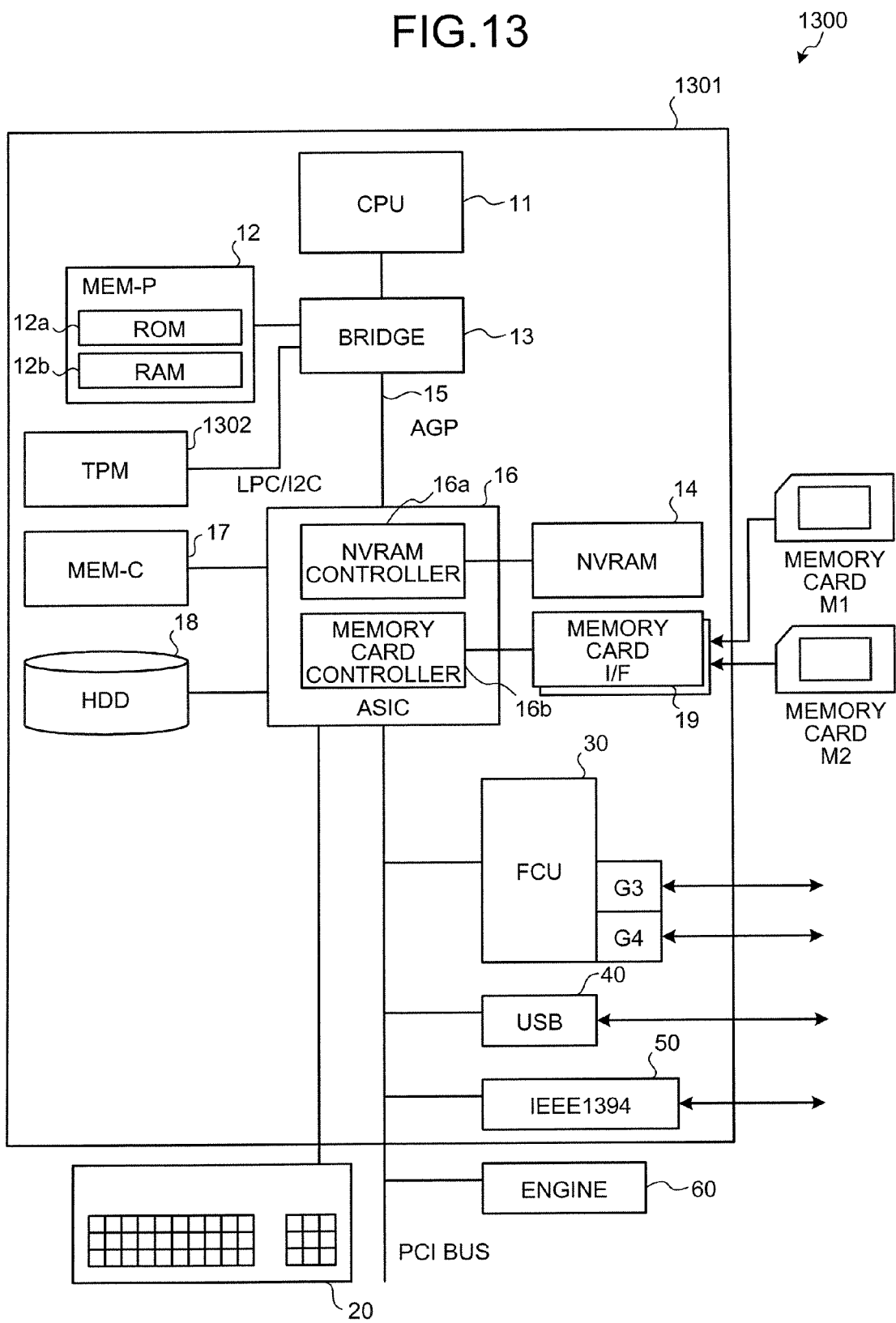
FIG. 13 is a block diagram of a hardware configuration of a multi function peripheral according to a third embodiment of the present invention.

FIG. 13 is a block diagram of a hardware configuration of a multi function peripheral 1300 according to the third embodiment. The multi function peripheral 1300 according to the third embodiment is different from the multi function peripheral 100 according to the first embodiment in that the controller 10 is changed to a controller 1301 added with a trusted platform module (TPM) 1302 is added. Like reference numerals refer to like constituent elements in the first embodiment, and explanations thereof will be omitted.

The TPM 1302 is a security chip for storing a cryptographic key, and it is connected to the BRIGDE 13 via a low-pin count (LPC) or an inter-integrated circuit (I2C). Specifically, the TPM 1302 performs encryption processing of the permission information stored in the NVRAM 14 using the cryptographic key, or performs decryption processing using the cryptographic key at the time of writing the permission information back from the memory card at a backup destination. That is, because the processing relating to cryptogram is complete in the TPM 1302, leakage of the information used for writing back, such as the cryptographic key, can be prevented.

In other words, the information encrypted by the TPM 1302 can be decrypted only by the same TPM 1302. The configuration of the multi function peripheral 1300 is different from the configuration of the multi function peripheral 100 in the first embodiment in that, in FIG. 2, the SCS 122 is changed to an SCS 1401 having different processing.

Figure 14:
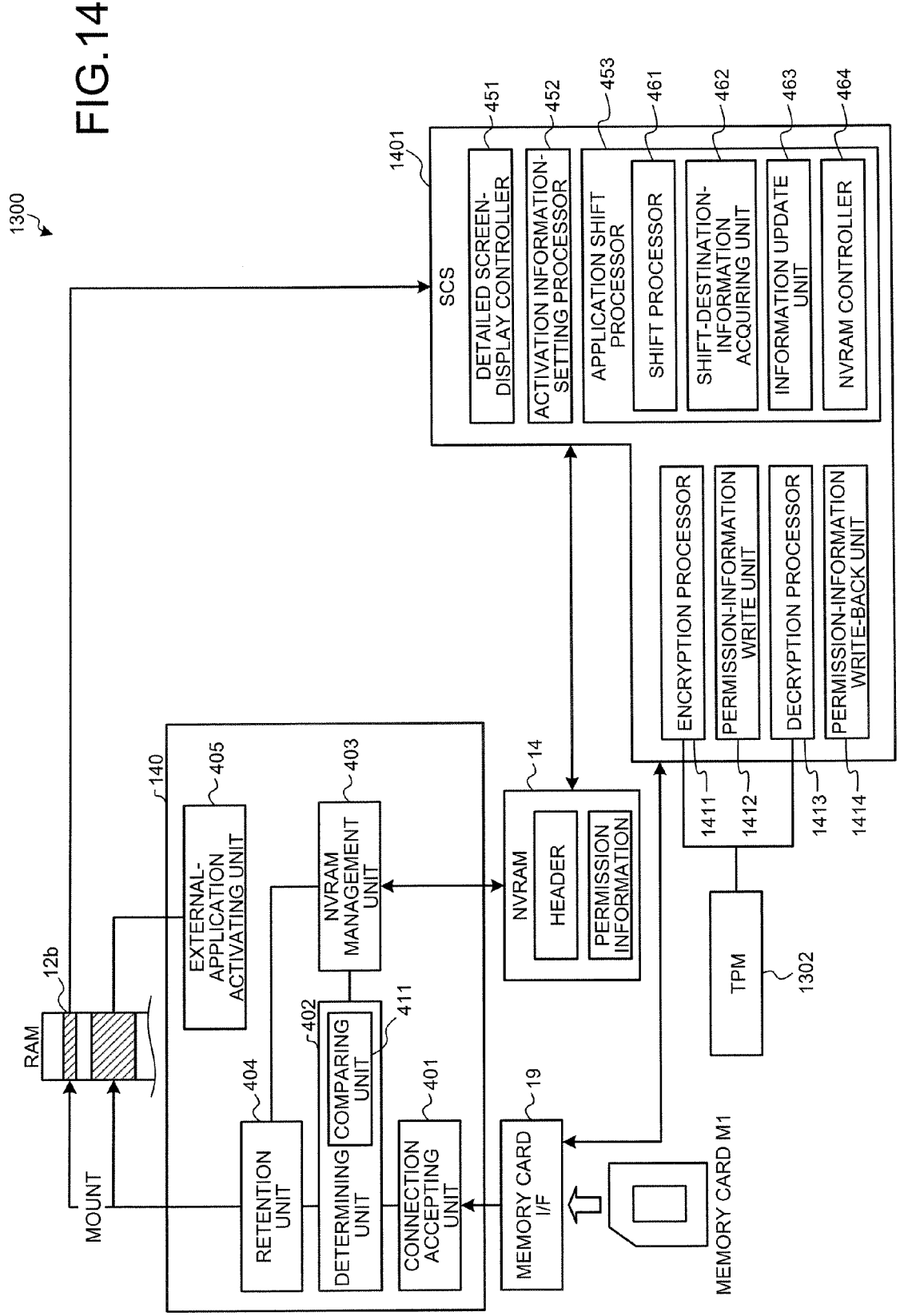
FIG. 14 is a block diagram of a configuration of a multi-function-peripheral activating unit and a SCS of the multi function peripheral according to the third embodiment.

FIG. 14 is a block diagram of a functional configuration of the multi-function-peripheral activating unit 140 and the SCS 1401 of the multi function peripheral 1300 according to the third embodiment. The SCS 1401 is different from the SCS 122 in the first embodiment in that it further includes an encryption processor 1411, a permission-information write unit 1412, a decryption processor 1413, and a permission-information write-back unit 1414.

The encryption processor 1411 acquires the information (for example, permission information and public key information) stored in the NVRAM 14 and encrypts the acquired information. Specifically, the encryption processor 1411 reads the information from the NVRAM 14 to output the information to the TPM 1302 together with a notification indicating that encryption processing is to be performed, and after the information is encrypted in the TPM 1302, acquires the encrypted information from the TPM 1302.

The permission-information write unit 1412 writes the information (including the permission information and the public key information) encrypted by the encryption processor 1411 on the memory card M1 attached to the multi function peripheral 1300. As a result, the information stored in the NVRAM 14 is backed up.

When the NVRAM 14 is replaced, the decryption processor 1413 acquires encrypted backup data from the memory card M1 storing the backup data, and decrypts the acquired information. Specifically, the decryption processor 1413 reads the backup data from the memory card M1 and outputs the backup data to the TPM 1302 together with a notification indicating that the backup data is to be decrypted, and after the backup data is decrypted in the TPM 1302, acquires the decrypted information from the TPM 1302.

The permission-information write-back, unit 1414 writes back the information (including the permission information and the public key information) decrypted by the decryption processor 1413 in the NVRAM 14 newly replaced in the multi function peripheral 1300. The information stored previously in the NVRAM 14 is restored from the backup data stored on the memory card M1.

Figure 15:
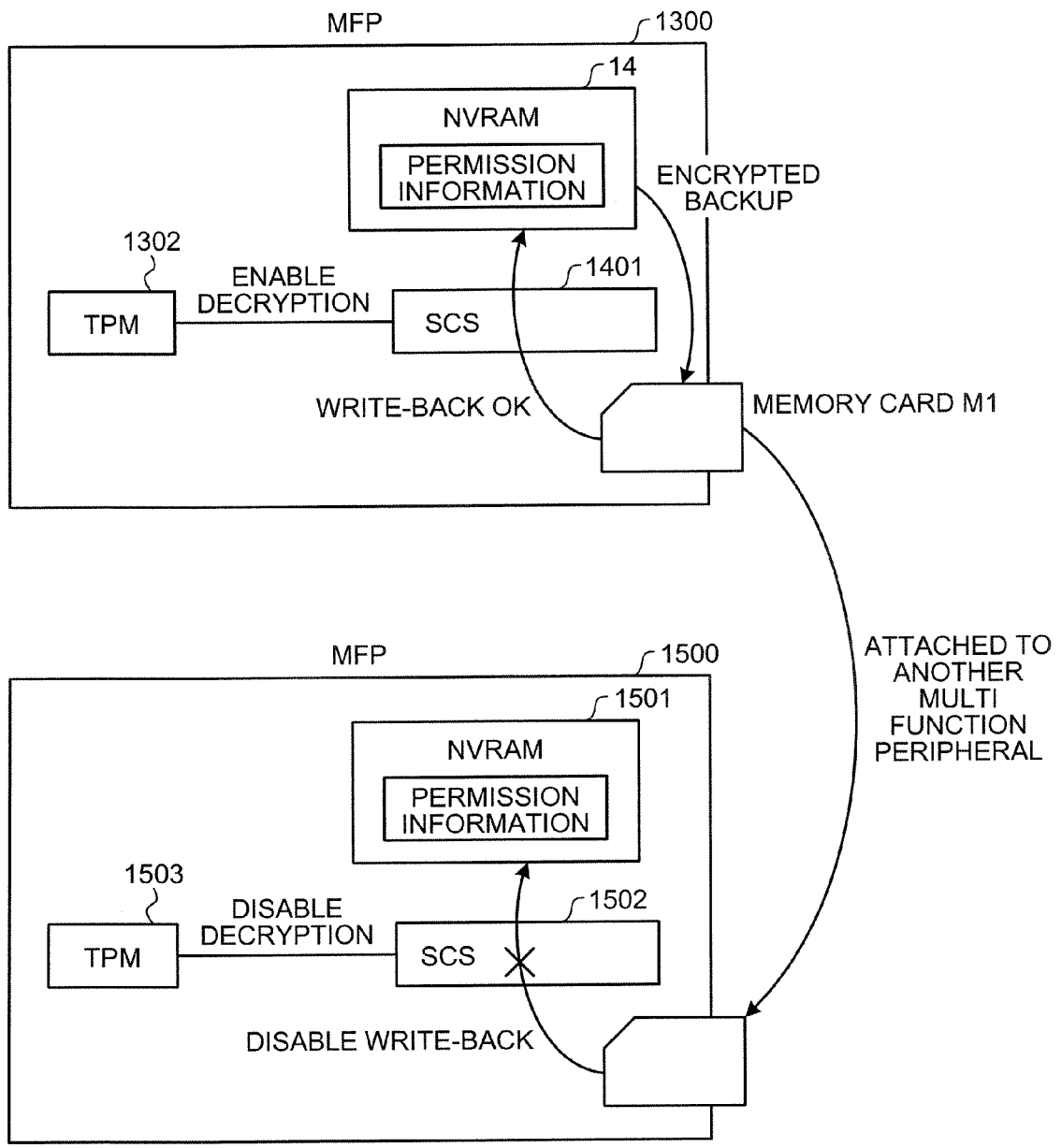
FIG. 15 is a schematic for explaining a concept when a memory card backed up by the multi function peripheral according to the third embodiment is written back by another multi function peripheral.

FIG. 15 is a schematic for explaining a concept when the memory card M1 activated by the multi function peripheral 100 according to the third embodiment is written back by another multi function peripheral 1500. As shown in FIG. 15, the information activated on the memory card M1 by the multi function peripheral 1300 can be decrypted by using the same TPM 1302 and developed in the NVRAM 14.

When the information activated on the memory card M1 in the multi function peripheral 1300 is to be developed in an NVRAM 1501 in another multi function peripheral 1500, a TPM 1503 cannot decrypt the information, because the encrypted information can be decrypted only by the same chip. Accordingly, development of the information from the backup data to the NVRAM 1501 in the multi function peripheral 1501 can be suspended.

In other words, by preventing copy of the permission information and the like to another multi function peripheral, the application stored on a memory card, activation of which is permitted only in a predetermined multi function peripheral, can be prevented from being illegally activate by another multi function peripheral.

Figure 16:
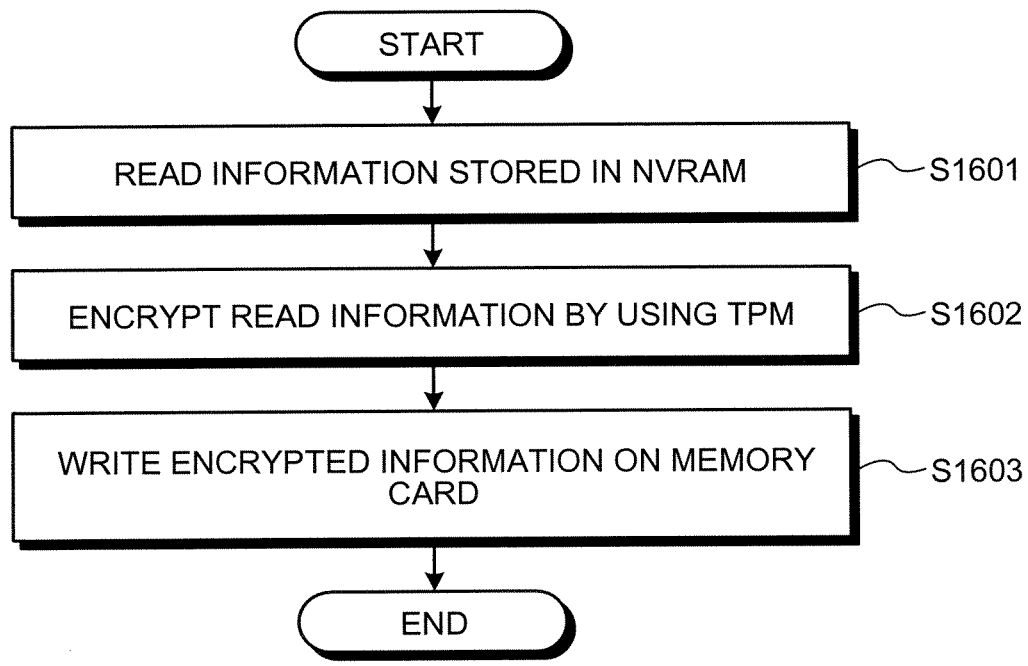
FIG. 16 is a flowchart of a process procedure performed in the multi function peripheral according to the third embodiment, from reading information stored in an NVRAM to backing up the information on the memory card.

The processing from reading information stored in the NVRAM 14 to backing up the information on the memory card M1 in the multi function peripheral 1300 according to the third embodiment is explained. FIG. 16 is a flowchart of a process procedure performed in the multi function peripheral 1300 in the third embodiment.

The encryption processor 1411 reads the information stored in the NVRAM 14 (the permission information and the public key) (step S1601).

The encryption processor 1411 encrypts the read information by using the TPM 1302 (step S1602).

The permission-information write unit 1412 writes the encrypted information on the memory card M1 (step S1603).

The information stored in the NVRAM 14 is encrypted and backed up by performing the above processing by the multi function peripheral 1300.

Figure 17:
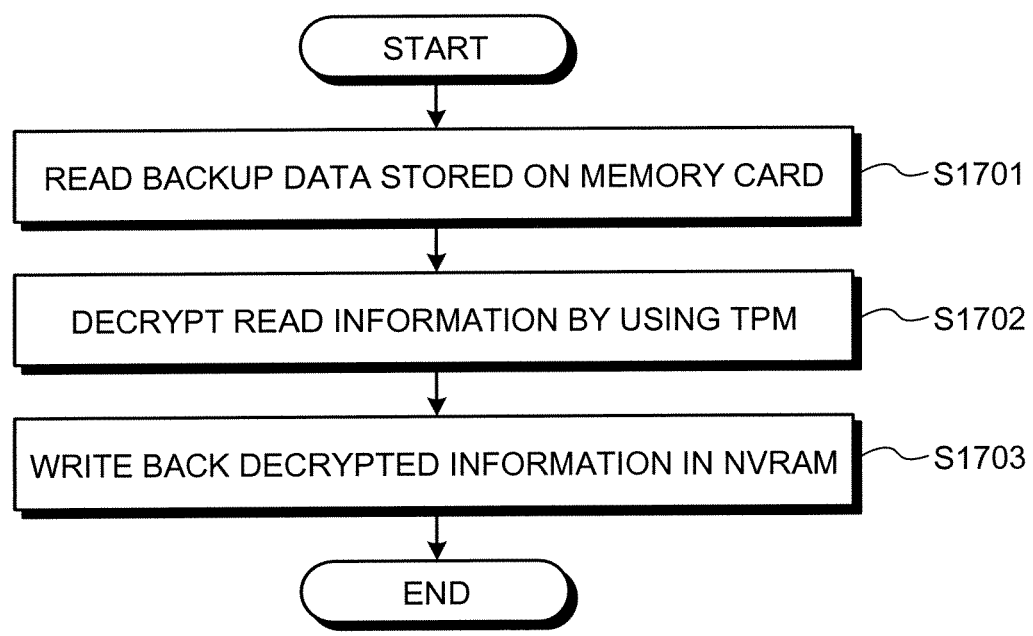
FIG. 17 is a flowchart of a process procedure performed in the multi function peripheral according to the third embodiment, from reading backup data stored on the memory card to writing back the data in the NVRAM.

The processing from reading the backup data stored on the memory card M1 to writing back the data in the NVRAM 14 in the multi function peripheral 1300 according to the third embodiment is explained. FIG. 17 is a flowchart of a process procedure performed in the multi function peripheral 1300 according to the third embodiment.

The decryption processor 1413 reads the backup data stored on the memory card M1 (step S1701).

The decryption processor 1413 decrypts the read backup data by using the TPM 1302 (step S1702).

The permission-information write-back unit 1414 writes back the decrypted backup data in the NVRAM 14 (step S1703).

The backup data can be decrypted and written back by performing the above processing by the multi function peripheral 1300.

In the third embodiment, because the permission information and the like stored in the NVRAM 14 can be backed up, in addition to the effect shown in the first and second embodiments, even if there is a trouble in the NVRAM 14, the NVRAM 14 is replaced and the backed up permission information and the like can be written back, thereby enabling restoration of the information to the original state.

Further, because encryption processing is performed at the time of backup and decryption processing is performed at the time of write back, the permission information can be prevented from being written back to another multi function peripheral. Therefore, illegal execution of the external application stored on a memory card by other multi function peripherals can be prevented.

The application executing apparatus, the application execution method, and the application execution program according to the present invention are useful for a technique for activating an application stored on an external storage medium, and particularly suitable for a technique for permitting activation of only an application set by the administrator.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An application executing apparatus comprising:
   a connecting unit configured to receive connection of an external storage medium that stores therein a plurality of applications associated with a multifunction device, mounting information of each of the applications, and first medium identification information unique to the external storage medium;
   a memory reader that reads the applications, the mounting information, and the first medium identification information from the external storage medium, when the external storage medium is attached to the connecting unit;
   a storage unit that stores therein permission information associated with the applications and the first medium identification information, wherein the permission information indicates whether execution of the applications corresponding thereto is to be permitted, and the permission information was created using the first medium identification information;
   a determining unit that determines whether to execute the applications stored on the external storage medium by comparing the first medium identification information and the applications stored on the external storage medium, and the permission information stored in the storage unit of the application execution apparatus; and
   an application activating unit that activates the applications in accordance with the mounting information, when the determining unit determines to execute the applications.

2. The application executing apparatus according to claim 1, further comprising:
   a readable and writable temporary storage unit; and
   a retention unit that retains an area required for executing the applications in the temporary storage unit when the determining unit determines to execute the applications, wherein
   the application activating unit executes the applications from the area retained in the temporary storage unit by the retention unit.

3. The application executing apparatus according to claim 1, further comprising:
   a readable and writable temporary storage unit; and
   a retention unit that retains an area required for executing the applications, which are stored on the external storage medium, in the temporary storage unit, wherein
   the application activating unit executes the applications from the area retained in the temporary storage unit by the retention unit.

4. The application executing apparatus according to claim 1, further comprising a writing unit that writes the permission information stored in the storage unit on the external storage medium.

5. The application executing apparatus according to claim 4, further comprising an encrypting unit that encrypts the permission information, wherein
   the writing unit writes the permission information encrypted by the encrypting unit on the external storage medium.

6. The application executing apparatus according to claim 4, further comprising a write-back unit that writes the permission information written on the external storage medium by the writing unit back into the storage unit.

7. The application executing apparatus according to claim 5, further comprising:
   a decrypting unit that decrypts the permission information encrypted by the encrypting unit and written on the external storage medium by the writing unit; and
   a write-back unit that writes the permission information decrypted by the decrypting unit back into the storage unit.

8. The application executing apparatus according to claim 1, wherein the connecting unit includes a first connecting unit configured to receive connection of a first external storage medium and a second connecting unit configured to receive connection of a second external storage medium, the application executing apparatus further comprising:
   a shift processor that shifts a first application stored on the first external storage medium to the second external storage medium; and
   an update unit that performs update processing such that execution of the permission information associated with the first application shifted by the shift processor is permitted on the second external storage medium at a shifted destination.

9. An application execution method performed by an application executing apparatus, the method comprising:
   receiving connection of an external storage medium that stores therein a plurality of applications associated with a multifunction device, mounting information of each of the applications, and first medium identification information unique to the external storage medium;

reading the applications, the mounting information, and the first medium identification information from the external storage medium;

determining whether to execute the applications stored on the external storage medium by comparing the first medium identification information and the applications stored on the external storage medium, and permission information associated with the medium identification information and the applications, indicating whether to permit execution of the applications, and stored in a storage unit of the application executing apparatus, wherein the permission information indicates whether execution of the applications corresponding thereto is to be permitted, and the permission information was created using the first medium identification information; and activating the applications in accordance with the mounting information, when it is determined by the determining to execute the applications.

10. The application execution method according to claim 9, further comprising:

retaining an area required for executing the applications in a readable and writable temporary storage unit, when it is determined at the determining to execute the applications, wherein the activating includes activating the applications from the area retained in the temporary storage unit at the retaining.

11. The application execution method according to claim 9, further comprising:

retaining an area required for executing the applications, which is stored on the external storage medium, in a readable and writable temporary storage unit, wherein the activating includes activating the applications from the area retained in the temporary storage unit at the retaining.

12. The application execution method according to claim 9, further comprising writing the permission information stored in the storage unit on the external storage medium.

13. The application execution method according to claim 12, further comprising encrypting the permission information, wherein the writing includes writing the permission information encrypted at the encrypting on the external storage medium.

14. The application execution method according to claim 12, further comprising writing the permission information written on the external storage medium at the writing back into the storage unit.

15. The application execution method according to claim 13, further comprising:

decrypting the permission information encrypted at the encrypting and written on the external storage medium at the writing; and writing the permission information decrypted at the decrypting back into the storage unit.

16. The application execution method according to claim 9, wherein the receiving includes receiving connection of a first external storage medium and a second external storage medium, the application executing method further comprising:

shifting a first application stored on the first external storage medium to the second external storage medium; and performing update processing such that execution of the permission information associated with the first application shifted at a shifting is permitted on the second external storage medium at the shifted destination.

* * * * *